United States Patent [19]

Kersten

[11] 4,145,457

[45] Mar. 20, 1979

[54] METHOD FOR THE PRODUCTION OF OPTICAL DIRECTIONAL COUPLERS

[75] Inventor: Ralf Kersten, Rottach-Egern, Fed. Rep. of Germany

[73] Assignee: Siemens Aktiengesellschaft, Berlin & Munich, Fed. Rep. of Germany

[21] Appl. No.: 890,928

[22] Filed: Mar. 28, 1978

Related U.S. Application Data

[63] Continuation of Ser. No. 740,945, Nov. 11, 1976, abandoned.

[30] Foreign Application Priority Data

Nov. 28, 1975 [DE] Fed. Rep. of Germany ....... 2553685

[51] Int. Cl.² .............................................. B05D 3/06
[52] U.S. Cl. .................... 427/38; 350/96.15; 427/43; 427/272
[58] Field of Search .................... 427/38, 43, 272; 350/96 WG, 96 C

[56] References Cited

U.S. PATENT DOCUMENTS 3,622,382  11/1971  Brack et al. ............................ 427/38
3,666,548  5/1972  Brack et al. ............................ 427/38

OTHER PUBLICATIONS

Miller, "Bell System Tech. Journ.", Sep. 1969, pp. 2062, 2063.
Mercatili, "Bell System Tech. Journ.", Sep. 1969, pp. 2089-2095.
Schineller et al., "Journ. Opt. Soc. of America", Sep. 1968, pp. 1171-1176.

*Primary Examiner*—John H. Newsome
*Attorney, Agent, or Firm*—Hill, Gross, Simpson, Van Santen, Steadman, Chiara & Simpson

[57] ABSTRACT

A method for the production of optical directional couplers has a substrate with optical waveguides formed in a surface thereof which are longitudinally coupled by having the guides extend parallel to each other for a predetermined distance. The waveguides have a higher index of refraction than the substrate. By ion implantation step, the area of the substrate adjacent the surface which is covered has its index of refraction raised, while at the same time, the exposed areas which will form the waveguides is also subjected to the ion bombardment. Thereafter, by a second ion implantation step, the ions penetrate further into the region of the substrate where the waveguides are being formed to raise the index of refraction thereof. By this technique, narrow low-light-loss bends are produced.

10 Claims, 9 Drawing Figures

METHOD FOR THE PRODUCTION OF OPTICAL DIRECTIONAL COUPLERS

This is a continuation of application Ser. No. 740,945, filed Nov. 11, 1976 now abandoned.

BACKGROUND OF THE INVENTION

1. Field of the Invention

The invention relates to a method for the production of a layer-bound optical directional coupler at the surface of a substrate.

2. Description of the Prior Art

Directional couplers with waveguides arranged within a substrate are known in the art, whereby the waveguides which are to be coupled extend over a given path, in a straight line, parallel to each other. In order to couple a light wave from one waveguide to another, the two waveguides must have a spacing in the order of less than one micron, in the coupling area, if practical, applicable coupling lengths are to be realized. This requires an extremely precise, and thus expensive production technology.

SUMMARY OF THE INVENTION

It is an object of the invention to provide a directional coupler which can be produced with the number of operational processes in mass production.

This object is achieved, in accordance with this invention. A substrate surface is covered by masks and surface areas of the substrate are ion-implanted to form areas with an increased index of refraction.

In the case of a layer-bound direction coupler designed in this manner, the spacings of the two waveguides which extend parallel to each other in the coupling range, can be essentially increased, as compared with the spacings required of prior art directional couplers. This simplifies the production technology. The two waveguides are interconnected via a thin, highly refractory area in which the penetration depth of the light wave guided in a waveguide is greatly increased. Due to the greater spacing of the two waveguides from one another, tolerance problems can be essentially decreased. Furthermore, only one masking and ion-implantation process is required. Due to the selection of the mask thickness and the mask material, as well as the ion energy, ion type and ion dose, the waveguide properties can be varied within wide ranges.

Low-absorption dielectric materials are used as substrate material, having an index of refraction which increases in the case of ion impact, i.e., quartz glass or calcium fluoride.

In the areas beyond the coupling range, the waveguides which lead towards one another, must have bends. In order to have waveguide bends with little light loss, an improved method of production is suggested. Herefore, a first masking comprising the waveguide structure is, at first, carried out in the coupling areas and the adjacent boundary areas, in particular, and subsequently a second thinner mask is formed covering the uncovered areas of the coupling areas. Thereafter, all areas are uniformly exposed to ion bombardment. Due to this method, a structure with an increased index of refraction, as compared with the substrate material, is formed which has a thin layer-shaped area adjacent to the substrate, below the areas of the substrate covered by the mask, and which comprises a high refractory area below the areas of the substrate, which are left free from the masking material, whereby this highly refractory area is also adjacent to the substrate surface but extends deeper into the substrate.

Since both waveguides extends as far as to the substrate surface in the coupling area and are interconnected by a highly refractory layer, the spacing of the two waveguides can be increased without impairing the extent of the coupling efficiency. The waveguides are arranged deeper in the substrate and separate from the highly refractory layer adjacent to the substrate and separate from each other, beyond the coupling area, so that narrow, low-light-loss bends may be produced.

The method mentioned in the following results in another design with narrow low-loss bending radii of the waveguides leading towards the boundary area. First of all, as in the previously mentioned case, a first masking process comprising the wavelength structures, is carried out in the coupling areas and boundary areas, and a first ion implantation is subsequently carried out in such a way that the ions penetrate into the substrate only in the areas which are not covered. Subsequently, boundary areas, which are only adjacent to the coupling areas, are covered by a second mask, and a second ion implantation is carried out.

Due to this method mutually separate waveguide areas with good guidance properties and positioned adjacent to the surface of the substrate, are produced in the boundary areas, with the help of this method these waveguides are bound to a highly refractory layer in the coupling area and thus have good coupling properties.

BRIEF DESCRIPTION OF THE DRAWINGS

For an explanation, the following description of the figures is pointed out, whereby sample embodiments are used.

DESCRIPTION OF THE PREFERRED EMBODIMENTS

Figure 1:
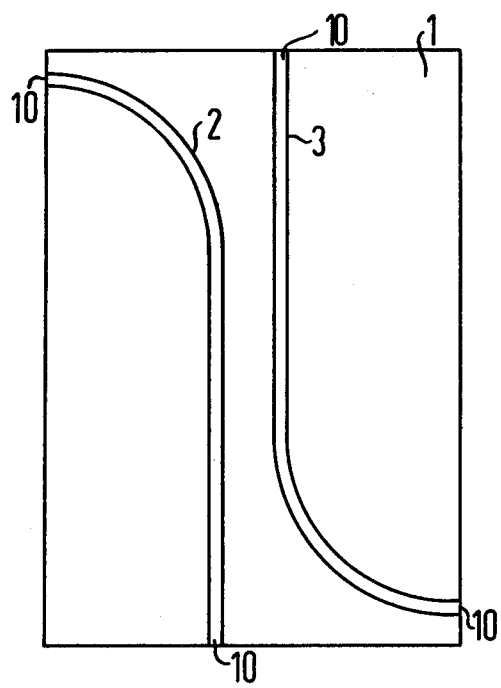
FIGS. 1 and 2 show a plan view and a cross section of a directional coupler produced in accordance with the invention.

As shown in FIG. 1, a quartz glass substrate 1 is provided having two strip-shaped areas 2 and 3 or 5 microns width arranged at its surface. These strip-shaped areas have an index of refraction which is increased with respect to the index of refraction of the substrate 1. The strip-shaped areas 2 and 3 are positioned approximately 0.3 micron below the surface of the substrate, as can also be seen in FIG. 2. In the center coupling area, the two strip-shaped areas 2 and 3 extend closely adjacent to and parallel to one another. They are here interconnected by a thinner layer 9 adjacent to the substrate surface which has the same index of refraction as the areas 2 and 3.

Figure 2:
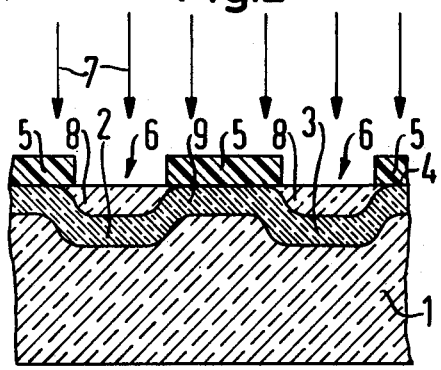

The production of this directional coupler is explained with reference to FIG. 2. A photo-lacquer mask 5 having a thickness of approximately 0.7 micron is applied on the surface 4 of the substrate 1, and it is interrupted in the areas 6 below which the waveguides are to be produced. This arrangement is now exposed to an ion bombardment in the direction of the arrows 7, homogeneously, using nitrogen ions, for example, with an energy of 300 keV. These ions permeate only slightly below the surface of the substrate, in its areas which are covered by the photo-lacquer mask 5, and there form an area adjacent to the surface, having a higher index of refraction than that of the substrate. In the area 6, which is not covered by the mask, the ions permeate deeper into the substrate, which forms higher refracting waveguide areas 2 and 3 which are separated by an ion-free substrate area 8.

In the coupling area of the waveguides 2 and 3, the energy of a wave supplied in the waveguide 2 reaches both through the high-refractory layer 9 and also through the untreated areas between the substrate surface 4 and waveguides 2 and 3 as far as to the inside of the waveguide 3, and is there taken over and further processed by this waveguide 3. The two waveguides 2 and 3 are positioned in the coupling area at a spacing from one another of approximately 5 microns.

Continuing waveguides are coupled to the directional coupler at the positions 10.

Figure 3:
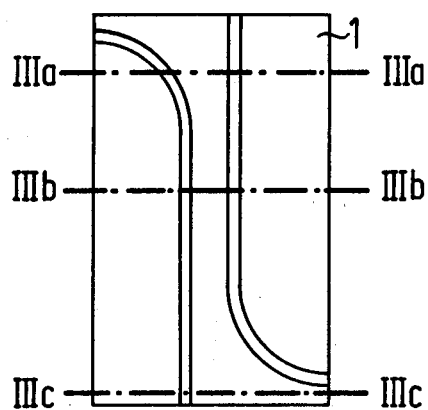
FIG. 3 shows a directional coupler produced in accordance with an improved method.

FIG. 3 shows a directional coupler with waveguides, permitting low light loss bending radii of less than one millimeter.

Figure 3A:
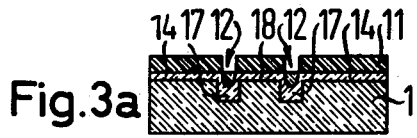
FIGS. 3a, 3b and 3c show the method steps associated with the directional coupler in accordance with the present invention.
Figure 3B:
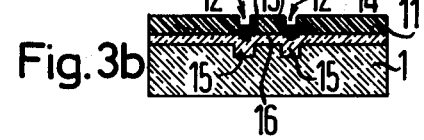
Figure 3C:
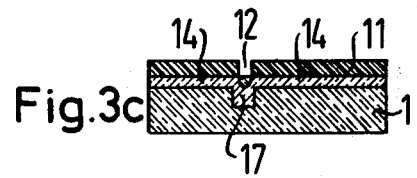

The method of production of this directional coupler and the high refractory waveguide structures, which are produced, are shown in FIGS. 3a to 3c.

FIG. 3a is a sectional view along IIIa–IIIa of FIG. 3. A first mask 11 is applied to the substrate 1, leaving free the substrate surface at locations 12, and the waveguides are to extend below these locations 12.

After this mask has been finished, a second masking material 13 is applied in the coupling area of the waveguides (FIG. 3b) only in the areas 12, which have been left free by the mask 11.

Subsequently, this device is exposed to a homogeneous ion bombardment. In all portion of the directional coupler, the ions permeate through the mask 11 to reach the surface of the substrate 1 and somewhat below, whereby a thin, highly refractory layer 14 is formed.

Since the waveguides 17 are positioned deeper below the substrate surface and separated therefrom in the same manner as from the layers 14 and 18, in the boundary areas of the directional coupler which are adjacent to the coupling area (FIG. 3a and FIG. 3c), no wave energy moves from one waveguide 17 into the other.

However, thicker highly-refractory waveguide areas 15, extending as far as to the substrate surface and permeating deeper into the substrate material are produced in the coupling areas, below the second masking material 13, having a thickness of 0.2 micron. (FIG. 3b). These waveguide areas 15 are interconnected by the highly refractory layer 16.

This directional coupler has the advantage of a greater spacing of the two waveguides in the coupling area, as well as also the advantage of a very small bending radii in the boundary area.

Figure 4:
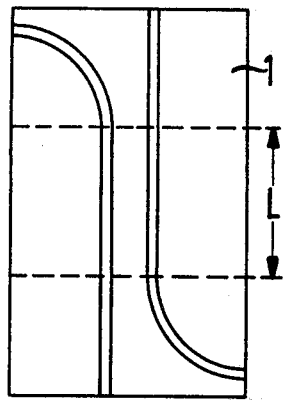
FIG. 4 shows a directional coupler produced in accordance with an alternative method.
Figure 4A:
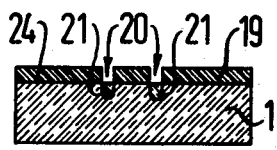
FIGS. 4a and 4b show associated method steps.
Figure 4B:
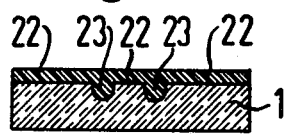

The production of a directional coupler, also having a very small bending radii, is explained with the help of FIGS. 4, 4a and 4b. In the case of this method, no adjusting measures are required for the second masking of the method described hereinbefore. Furthermore, this method, in the same manner as the previously described one, has the advantages that the coupler can be tuned by way of varying the coupling length L depending on the coupling behavior demands.

Referring to FIG. 4, the "coupling" area is an area lying between the two broken lines and the coupling length is the distance between the two broken lines. The portion of the FIG. 4 lying beyond the coupling area may be referred to as the "boundary" areas.

The entire desired waveguide structure is provided on the substrate in the form of a photo-lacquer mask 19. The masking is selected so thick that, during a first ion bombardment, the ions cannot reach the substrate surface 24 at the covered positions. Highly-refractory areas 21 are merely produced at the uncovered, later waveguide areas 20, adjacent to the surface 24 of the substrate, and extending somewhat into the substrate. All parameters are thereby selected in such a way that the waveguide is an optimum, particularly in the bends of the waveguides at the desired optical wavelength. After the mask 19 has been removed, a second total-surface mask is applied in the boundary areas of the directional coupler, beyond the coupling areas of length L. It is true that a second subsequent homogeneous ion bombardment does not cause any further structural change in the waveguides positioned in the masked areas adjacent to the coupling area, but it produces a highly refractory layer 22, adjacent to the substrate surface, in the coupling area which is now not masked, so that the two waveguides 21 from FIG. 4a are now again interconnected by the layer 22, building the waveguides 23 (FIG. 4b).

While strong layer-bound waveguides are thus produced in the coupling area, permitting a coupling, the waveguides in the remaining areas maintain their good guidance properties.

Depending on the type of the second ion implantation, as well as the length L of the surface which is not covered by the second masking, a directional tuning of the coupler can be effected. If the coupling structure is initially selected correspondingly long, only a coarse directioning of the mask is required during the second masking process. The extent of coupling efficiency can then only be determined by the length L of the second implantation area which, technologically, may be reproduced very exactly.

Due to this technological process, it is possible that a large number of small structures can be produced by the first implantation, and these can, respectively, be individually tuned with respect to their application by the second ion implantation.

It will be apparent to those skilled in the art that many modifications and variations may be effected without departing from the spirit and scope of the novel concepts of the present invention.

I claim as my invention:

1. A method for producing a layer-bound optical directional coupler at the surface of a substrate, said coupler comprising a substrate containing a pair of waveguide structures and having three regions, in the first of said regions the waveguide structures approach each other, in the second of said regions the waveguide structures are parallel to and closely spaced from each other and in the third of said regions the waveguide structures diverge from each other, said first and third regions being defined as boundary regions, said second region being defined as a coupling regions, said waveguide structures comprising optical pathways in said substrate defined by an increased index of refraction, said substrate in the coupling region also having an increased index of refraction between the waveguide structures, said method comprising the steps of:

masking the surface of the substrate to provide areas covered with masking material and open areas which outline the waveguide structures which are to be produced; and bombarding the entire surface of the substrate with ions both through the open areas and through the areas covered with masking material to form the waveguide structures below the open areas of the mask having increased indices of refraction, and an area having an increased index of refraction between the waveguide structures and adjacent the surface to optically couple the waveguide structures.

2. The method of claim 1, in which low-absorption dielectric material is used as the substrate, which material has an increased index of refraction when subjected to ion bombardment.

3. The method of claim 2, in which the substrate is formed of quartz glass.

4. The method of claim 2, in which the substrate is formed of calcium fluoride.

5. A method for producing a layer-bound optical directional coupler at the surface of a substrate, said coupler comprising a substrate containing a pair of waveguide structures and having three regions, in the first of said regions the waveguide structures approach each other, in the second of said regions the waveguide structures are parallel to and closely spaced from each other and in the third of said regions the waveguide structures diverge from each other, said first and third regions being defined as boundary regions, said second region being defined as a coupling region, said waveguide structures comprising optical pathways in said substrate defined by an increased index of refraction, said substrate in the coupling region also having an increased index of refraction between the waveguide structures, said method comprising the steps of:

masking the surface of the substrate to provide areas covered with masking material and spaced open areas which outline the waveguide structures to be produced;

masking portions of the open areas with thinner masking material in the coupling region between the two boundary regions; and bombarding the entire surface of the substrate with ions through the openings, through the first-mentioned masking material and through the thinner masking material to increase the indices of refraction in portions of the substrate such that a thin highly-refractive layer is formed at the surface of the substrate in the boundary regions, the waveguide structures are formed below the surface of the substrate in the boundary and coupling regions, and a thicker highly refractive area is formed adjacent the surface of the substrate in the coupling region to couple the waveguide structures in that region.

6. The method of claim 5, in which the substrate material is formed of quartz glass.

7. The method of claim 5, in which the substrate material is formed of calcium fluoride.

8. A method for producing a layer-bound optical directional coupler at the surface of a substrate, said coupler comprising a substrate containing a pair of waveguide structures and having three regions, in the first of said regions the waveguide structures approach each other, in the second of said regions the waveguide structures are parallel to and closely spaced from each other and in the third of said regions the waveguide structures diverge from each other, said first and third regions being defined as boundary regions, said second region being defined as a coupling region, said waveguide structures comprising optical pathways in said substrate defined by an increased index of refraction between the waveguide structures, said method comprising the steps of:

masking the surface of the substrate to provide areas covered with masking material and open areas which outline the waveguide structures to be produced;

bombarding the surface of the substrate with ions through the open areas to increase the index of refraction in the substrate adjacent the surface below the open areas;

removing the masking material;

masking the surface of the substrate to cover the boundary regions with masking material and provide an opening over the coupling region; and bombarding the surface of the substrate through the opening in the second-mentioned mask to increase the index of refraction of the region previously covered with the first-mentioned masking material and optically interconnect the areas of increased indices of refraction formed by the first ion bombardment.

9. The method of claim 8 in which the substrate material is formed of quartz glass.

10. The method of claim 8 in which the substrate material is formed of calcium fluoride.

* * * * *